United States Patent [19]

Nakagawa

[11] Patent Number: 5,271,922
[45] Date of Patent: Dec. 21, 1993

[54] PROCESS FOR PREPARING MOLECULAR SIEVES USING A SPARTEINE TEMPLATE

[75] Inventor: Yumi Nakagawa, Kensington, Calif.

[73] Assignee: Chevron Research and Technology Company, San Francisco, Calif.

[21] Appl. No.: 959,001

[22] Filed: Oct. 9, 1992

[51] Int. Cl.⁵ ............................................. C01B 33/26
[52] U.S. Cl. .................. 423/702; 423/328.2; 423/706; 502/64
[58] Field of Search ................ 423/706, 329.1, 329.2; 502/64

[56] References Cited

U.S. PATENT DOCUMENTS

| | | | |
|---|---|---|---|
| 4,707,461 | 11/1987 | Mitchell et al. | 502/64 |
| 5,053,373 | 10/1991 | Zones | 502/66 |
| 5,106,801 | 4/1992 | Zones et al. | 423/329.1 |
| 5,187,132 | 2/1993 | Zones et al. | 502/64 |

*Primary Examiner*—Anthony McFarlane
*Attorney, Agent, or Firm*—W. K. Turner; R. J. Sheridan

[57] ABSTRACT

The present invention relates to a process for preparing crystalline molecular sieves, particularly large pore zeolites, which comprises contacting active sources of one or more oxides selected from the group consisting of monovalent element oxides, divalent element oxides, trivalent element oxides, tetravalent element oxides, and pentavalent element oxides with an organocation templating agent derived from sparteine.

16 Claims, No Drawings

PROCESS FOR PREPARING MOLECULAR SIEVES USING A SPARTEINE TEMPLATE

BACKGROUND OF THE INVENTION

1. Field of the Invention

The present invention relates to a process for preparing crystalline molecular sieves, particularly large pore zeolites, using a sparteine templating agent. More particularly, the process comprises contacting active sources of one or more oxides selected from the group consisting of monovalent element oxides, divalent element oxides, trivalent element oxides, tetravalent element oxides, and pentavalent metal oxides with an organocation templating agent derived from sparteine.

2. State of the Art

Natural and synthetic crystalline molecular sieves are useful as catalysts and adsorbents. Each crystalline molecular sieve is distinguished by a crystal structure with an ordered pore structure, and is characterized by a unique X-ray diffraction pattern. Thus, the crystal structure defines cavities and pores which are characteristic of the different species. The adsorptive and catalytic properties of each crystalline molecular sieve are determined in part by the dimensions of its pores and cavities. Accordingly, the utility of a particular molecular sieve in a particular application depends at least partly on its crystal structure.

In general, molecular sieves are prepared by crystallization in an aqueous reaction mixture containing an organic templating agent, such as a nitrogen-containing organocation. By varying the synthesis conditions and composition of the reaction mixture different zeolites can be formed.

The choice of the organocation templating agent is believed to play an important role in the process of molecular sieve crystallization. Organic amines and quaternary ammonium cations were first used in the synthesis of zeolites in the early 1960s as reported by R. M. Barrer and P. J. Denny in *J. Chem. Soc.* 1961 at pages 971–982. This approach led to a significant increase in the number of new zeolitic structures discovered as well as an expansion in the boundaries of composition of the resultant crystalline products.

Previously, products with low silica to alumina ratios ($SiO_2/Al_2O_3 \leq 10$) had been obtained, but upon using the organocations as components in the starting gels, zeolites with increasingly high $SiO_2/Al_2O_3$ were realized. Some of these materials are reported by R. M. Barrer 1982, *Hydrothermal Chemistry of Zeolites*, New York: Academic Press, Inc.

It has been postulated that the positive charge of the organocation templating species (and its sphere of hydration) interacts favorably with negatively charged silicate subunits, resulting in the crystallization of the resultant molecular sieve. An example of such templating involves the crystallization of sodalite in the presence of tetramethylammonium (TMA) cation as reported by Ch. Baerlocher and W. M. Meier, 1969, *Helv. Chimica Acta* 52, 1853. The TMA cations are found within the cavities of the sodalite cages, yet the 6.9 Å diameter of the cation (7.3 Å when hydrated) precludes it from entering the cavity via the 6-membered ring portals after formation of the structure; therefore the sodalite cage must result from growth around the cation.

Unfortunately, the relationship between structure of the organocation and the resultant zeolite is far from predictable, as evidenced by the multitude of products which can be obtained using a single quaternary ammonium salt as reported by S. I. Zones et al., 1989, *Zeolites: Facts, Figures, Future*, ed. P. A. Jacobs and R. A. van Santen, pp. 299–309, Amsterdam: Elsevier Science Publishers., or the multitude of organocations which can produce a single zeolitic product as reported by R. M. Barrer, 1989, *Zeolite Synthesis*, ACS Symposium 398, ed. M. L. Occelli and H. E. Robson, pp. 11–27, American Chemical Society.

Thus, it is known that organocations exert influence on the zeolite crystallization process in many unpredictable ways. Aside from acting in a templating role, the organic cation's presence also greatly affects the characteristics of the gel. These effects can range from modifying the gel pH to altering the interactions of the various components via changes in hydration (and thus solubilities of reagents) and other physical properties of the gel. Accordingly, investigators have now begun to consider how the presence of a particular quaternary ammonium salt influences many of these gel characteristics in order to determine more rigorously how such salts exert their templating effects.

It has been noted that many of the organocations which have been used as templates for zeolite synthesis are conformationally flexible. These molecules can adopt many conformations in aqueous solution, therefore several templates can give rise to a particular crystalline product. Studies which involved alterations on such conformationally flexible organic amines and cations have been published. For example, one study, Rollmann and Valyocsik, 1985, *Zeolites* 5, 123, describes how varying the chain length for a series of $\alpha,\omega$-linear diamines resulted in different intermediate-pore products. It has also been recently reported by M. D. Shannon et al., 1991, *Nature* 353, 417–420 that three different products which have related framework topologies, can be formed from three linear bis-quaternary ammonium templates of varying chain lengths.

Altering the structure of a conformationally rigid organic molecule can also lead to a change in the zeolite obtained, presumably due to the differing steric demands of each template. S. I. Zones, 1989, *Zeolites* 9, 458–467 reported that in switching from 1,3-dimethylimidazolium hydroxide to 1,3-diisopropylimidazolium hydroxide as template, using the same starting gel ($SiO_2/Al_2O_3 = 100$), the former directs toward formation of ZSM-22 whereas the latter affords ZSM-23. Further investigations of the influence of conformationally constrained templating agents are reported in Y. Nakagawa, et al. *Synthesis of Microporous Materials, Volume I*, Chapter 16, M. Occelli, H. Robson, ed.; Van Nostrand Reinhold, New York, 1992.

In summary, a variety of templates have been used to synthesize a variety of molecular sieves, including zeolites of the silicate, aluminosilicate, and borosilicate family. However, the specific utility of a given template is at present unpredictable. In fact, the likelihood of any given organocation to serve as an effective templating agent useful in the preparation of molecular sieves is conjectural at best.

Despite the unpredictable nature of molecular sieve templates, educated trial and error has led to the discovery of a few notable cyclic-organocation templating agents. For instance, the use of N,N,N-trimethyl cyclopentylammonium iodide in the preparation of Zeolite SSZ-15 molecular sieve is disclosed in U.S. Pat. No.

4,610,854 issued on Sep. 9, 1986 to Zones; use of 1-azoniaspiro [4.4] nonyl bromide and preparation of a molecular sieve termed "Losod" is disclosed in *Hel. Chim. Acta* (1974), Vol. 57, page 1533 (W. Sieber and W. M. Meier); use of 1,ω-di(1-azoniabicyclo [2.2.2.] octane) lower alkyl compounds in the preparation of Zeolite SSZ-16 molecular sieve is disclosed in U.S. Pat. No. 4,508,837 issued on Apr. 2, 1985 to Zones; use of N,N,N-trialkylammonio-1-adamantanes in the preparation of Zeolite SSZ-13 molecular sieve is disclosed in U.S. Pat. No. 4,544,538 issued on Oct. 1, 1985 to Zones. U.S. Pat. No. 5,053,373 issued on Oct. 1, 1991 to Zones discloses preparing SSZ-32 with an N-lower alkyl-N'-isopropyl-imidazolium cation templating agent. U.S. Pat. No. 5,106,801 issued on Apr. 21, 1992 to Zones, et al discloses a cyclic quaternary ammonium ion, and specifically a tricyclodecane quaternary ammonium ion, for the preparation of the metallosilicate Zeolite SSZ-31. U.S. Pat. No. 4,910,006 issued on Mar. 20, 1990 to Zones, et al teaches using a hexamethyl[4.3.3.0]propellane-8,11-diammonium cation for the preparation of SSZ-26.

Specific aza-polycyclics have also been disclosed for use as templating agents for various crystalline materials. For example, EP 0193282 discloses a tropinium cation for preparing the clathrasil zeolite ZSM-58. Similarly, use of quinuclidinium compounds to prepare a zeolite termed "NU-3" is disclosed in European Patent Publication No. 40016. U.S. Pat. No. 4,285,922 issued on Aug. 25, 1981 to Audeh, et al discloses preparing ZSM-5 using 1-alkyl-4-aza-1-azoniabicyclo[2.2.2]octane-4-oxide halides; and U.S. Pat. No. 3,692,470 issued on Sep. 19, 1972 discloses preparing ZSM-10 using 1,4-dimethyl-1,4-diazoniabicyclo[2.2.2]octane. The use of 3,7-diazabicyclo[3.3.1]nonanes as templating agents for SSZ-24 and large pore zeolites is disclosed in commonly assigned concurr filed U.S. patent application, Ser. No. 958,612, entitled "A PROCESS FOR PREPARING MOLECULAR SIEVES USING 3,7-DIAZABICYCLO[3.3.1]NONANE TEMPLATES". The use of 1,3,3,8,8-pentamethyl-3-azoniabicyclo[3.2.-1]octanes as templating agents for large pore zeolites is disclosed in commonly assigned concurrently filed U.S. patent application, Ser. No. 958,832, entitled "A PROCESS FOR PREPARING MOLECULAR SIEVES USING 1,3,3,8,8-PENTAMETHYL-3-AZONIABICYCLO[3.2.1]OCTANE TEMPLATES". The use of 9-azoniabicyclo[3.3.1]nonanes as templating agents for SSZ-24 and other large pore zeolites is disclosed in commonly assigned concurrently filed U.S. patent application, Ser. No. 958,634, entitled "A PROCESS FOR PREPARING MOLECULAR SIEVES USING 9-AZABICYCLO[3.3.1]NONANE TEMPLATES".

Thus, organocation templating agents have been used to prepare many different combinations of oxides with molecular sieve properties, with silicates, aluminosilicates, aluminophosphates, borosilicates and silicoaluminophosphates being well known examples.

OBJECTS OF THE INVENTION

It is the principle object of the process embodiment of the present invention to provide a method for synthesizing a variety of molecular sieves using a templating agent selected from the class of conformationally constrained water-soluble materials characterized by a cation of the sparteine family.

This and other objects are accomplished by the invention summarized below.

SUMMARY OF THE INVENTION

The present invention is directed to a process for preparing molecular sieves, particularly those molecular sieves classified as large pore size zeolites, that is, zeolites having average pore diameters greater than about 6.0 Angstroms.

In its broadest process embodiment the present invention is a method for synthesizing molecular sieves which comprises contacting active sources of one or more oxides selected from the group consisting of monovalent element oxides, divalent element oxides, trivalent element oxides, tetravalent element oxides, and pentavalent metal oxides with an organocation templating agent derived from sparteine.

Thus, the essence of the present invention resides in the discovery that a variety of molecular sieves can be synthesized using a conformationally constrained water-soluble templating agent derived from a cation of the sparteine family. The preferred cation is selected from alkylammonium salts having a sparteine quaternary cation characterized by a ring structure depicted as:

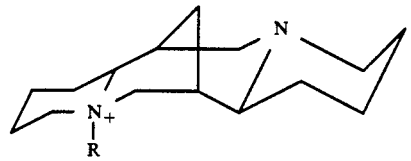

wherein R is selected from the group consisting of hydrogen and a lower branched or straight chain alkyl, preferably of from 1 to about 10 carbon atoms.

The full scope of the present invention will be apparent to those familiar with molecular sieve synthesis from the following detailed description of the principle features of the process embodiment and from the examples which accompany the description.

DETAILED DESCRIPTION OF THE INVENTION

Principle Features

In its process embodiment the present invention comprises contacting an active source of one or more oxides selected from the group consisting of monovalent element oxides, divalent element oxides, trivalent element oxides, tetravalent element oxides, and pentavalent metal oxides with an organocation templating agent having a sparteine ring system.

In practice the process may be carried out in steps which comprise:

(a) preparing an aqueous solution containing sources of at least one oxide capable of forming a crystalline molecular sieve and at least one conformationally constrained water-soluble sparteine salt having an anion which is not detrimental to the formation of the molecular sieve;

(b) maintaining the aqueous solution under conditions sufficient to form crystals of molecular sieve; and (c) recovering the crystals of molecular sieve.

The Templating Agents

The templating agents useful in the present process are salts of the sparteine family. They have a molecular structure of the general form:

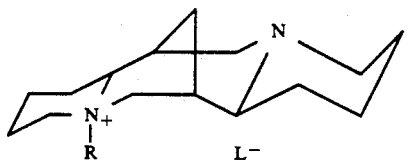

R is selected from the group consisting of hydrogen and straight or branched chain lower alkyl, most preferably having from 1 to about 3 carbon atoms: and L is an anion which is not detrimental to the formation of said molecular sieves.

In particular, each organocation of the family has two nitrogen heteroatoms, one of which is a charged quaternary ammonium heteroatom, and a multiplicity of rings one of which is formed by a methylene bridging unit. The anion for the salt may be essentially any anion such as halide or hydroxide which is not detrimental to the formation of the molecular sieve. As used herein, "halide" refers to the halogen anions particularly fluorine, chlorine, bromine, iodine, and combinations thereof. Thus, representative anions include hydroxide, acetate, sulfate, carboxylate, tetrafluoroborate, and halides, such as fluoride, chloride, bromide, and iodide. Hydroxide and iodide are particularly preferred as anions.

Many of the organocation salts which have been disclosed for use as templates for molecular sieve synthesis are conformationally flexible. These molecules adopt many conformations in aqueous solution, and several templates can give rise to a single crystalline product. In contrast, the defined sparteine templating agents used in the present invention are conformationally constrained organic molecules. Altering the structure of these relatively rigid molecules can lead to a change in the molecular sieve obtained, presumably due to the differing steric demands of each template. However, increasing the steric requirements of the template may lead to a decrease in crystallization rate as well as a decrease in template solubility in the reaction mixture. If the template is not sufficiently soluble, or if the template has particularly bulky substituent groups, it may be difficult to form crystals in the reaction mixture. Addition of a surfactant to the reaction mixture may help to solubilize the template.

Specific organocation salts useful as templating agents according to the present invention include salts of sparteine, salts of methyl-sparteine, and the like. Sparteine sulfate is commercially available as an extract from yellow and black lupin beans used as an antiarrthymic and diuretic. The methyl sparteine salts may be prepared by neutralizing commercially available sparteine sulfate pentahydrate (Aldrich), then alkylating the diamine with an alkyl halide. Following purification by recrystallization, the halide salt can be ion-exchanged to the corresponding hydroxide salt using an ion-exchange resin.

The Preparation of Molecular Sieves

As used herein the term "molecular sieve" refers to a material prepared according to the present invention having a fixed, open-network structure, usually crystalline, that may be used to separate hydrocarbons or other mixtures by selective occlusion of one or more of the constituents, or may be used as a catalyst in a catalytic conversion process.

As used herein the term "zeolite" refers to a molecular sieve containing a silicate lattice, usually in association with some aluminum, boron, gallium, iron, and/or titanium. In the following discussion, the terms molecular sieve and zeolite will be used more or less interchangeably, since most of the work was carried out on zeolites. However, one skilled in the art will recognize that the teachings relating to zeolites are also applicable to the more general class of materials called molecular sieves.

As used herein the term "silicate" refers to a zeolite having a high $SiO_2/Al_2O_3$ mole ratio, preferably a $SiO_2/Al_2O_3$ mole ratio greater than 100.

In preparing a molecular sieve, especially a zeolite, according to the present invention, the sparteine templating agent described above is used as a crystallization template in the manner of other well known molecular sieve templating agents. Thus, the method of this invention for preparing crystalline molecular sieves can be used to prepare such sieves of different compositions depending on starting materials and reaction conditions. For example, factors which may affect the crystallization of the molecular sieve formed include the specific defined sparteine template used, source of inorganic reagents used, the concentration of alkali metal and/or silica and/or germanium and/or trivalent metal oxide, and the temperature and time.

The crystalline materials of this invention comprise the templating agent in combination with metallic and non-metallic oxides bonded in tetrahedral coordination through shared oxygen atoms to form a cross-linked three dimensional crystal structure. The metallic and non-metallic oxides comprise one or a combination of oxides selected from the group consisting of one or more trivalent element(s), and one or more tetravalent element(s). The trivalent element is preferably selected from the group consisting of aluminum, boron, iron, gallium, titanium, and combinations thereof. More preferably, the trivalent element is aluminum or boron. The tetravalent element is preferably selected from the group consisting of silicon, germanium, and combinations thereof. More preferably, the tetravalent element is silicon.

The crystalline material comprises one or a combination of oxides, said oxides being selected from monovalent elements, divalent elements, trivalent elements, tetravalent elements, and pentavalent elements. The crystalline material also contains the sparteine templating agent described above. The general formula of the crystalline material composition, as synthesized and in the anhydrous state, in terms of oxide mole ratios, is (from about 1.5 to about 30)Q:(from about 0.25 to about 15.0)$M_2O$:$W_2O_3$:(greater than about 50)$YO_2$ wherein: Q is the sparteine templating agent described above; M is one or a combination of alkali metal cations and/or alkaline earth metal cations; W is one or a combination of elements selected from aluminum, boron, gallium, iron, titanium, and mixtures thereof; Y is one or a combination of elements selected from silicon, germanium, and mixtures thereof.

The crystalline materials can be suitably prepared from an aqueous solution containing at least one defined sparteine templating agent of this invention, and at least one oxide capable of forming a crystalline molecular sieve. Examples of a suitable metal oxides include an alkali metal oxide, and oxides of aluminum, silicon, boron, germanium, iron, gallium, titanium, and the like.

The present process is suitable for preparing aluminosilicate and borosilicate zeolites from reaction mixtures prepared using standard zeolitic preparation techniques. As used herein the term "aluminosilicate" refers to a zeolite containing both alumina and silica. As used herein the term "borosilicate" refers to a zeolite containing both boron and silica. Typical sources of aluminum oxide for the reaction mixture include aluminates, alumina, aluminum colloids, aluminum oxide coated on silica sol, hydrated alumina gels such as $Al(OH)_3$, and aluminum compounds such as $AlCl_3$ and $Al_2(SO_4)_3$. Typical sources of silicon oxide include silicates, silica hydrogel, fumed silica, silicic acid, colloidal silica, tetraalkyl orthosilicates, and silica hydroxides. Boron as well as gallium, germanium, and iron can be added in forms corresponding to their aluminum and silicon counterparts.

Alternatively a source zeolite reagent may provide a source of aluminum or boron for the present process. In some cases, the source zeolite may also provide a source of silica. Alternatively, the source zeolite in its dealuminated or deboronated form may be used as a source of aluminum or boron and silica, with additional silicon added using, for example, the conventional sources listed above. The use of a source dealuminated zeolite reagent as a source of alumina and silica for the present process is more completely described in U.S. patent application Ser. No. 936,955, filed on Aug. 27, 1992, entitled "METHOD OF MAKING MOLECULAR SIEVES" by S. I. Zones, et al., the disclosure of which is incorporated herein by reference. The use of a source zeolite reagent as a source of boron for the present process is more completely described in commonly assigned U.S. application Ser. No. 699,870, filed on May 14, 1991, entitled "PREPARATION OF BOROSILICATE ZEOLITES" by S. I. Zones, et al., the disclosure of which is incorporated by reference.

Typically, an alkali metal hydroxide and/or an alkaline earth metal hydroxide, such as the hydroxide of sodium, potassium, lithium, cesium, rubidium, calcium, and magnesium, is used in the reaction mixture; however, this component can be omitted so long as the equivalent basicity is maintained. The defined sparteine templating agent may be used to provide hydroxide ion. Thus, it may be beneficial to ion exchange, for example, the halide for hydroxide ion, thereby reducing or eliminating the alkali metal hydroxide quantity required. The alkali metal cation or alkaline earth cation may be part of the as-synthesized crystalline oxide material, in order to balance valence electron charges therein.

Use of the organocation described herein as the templating agent allows the preparation of the borosilicate large-pore zeolite B-SSZ-24 from soluble sources of boron and silicon oxides, such as fumed silica and sodium borate. Previously, the preferred method of synthesizing a boron rich version of this material involved using a source zeolite, in this case, calcined boron-beta zeolite, as the starting source of boron and silica. The method disclosed herein constitutes an improvement in the synthetic procedure for making B-SSZ-24.

The present process is suitable for preparing silicates or "essentially alumina-free" zeolites, i.e., a product having a silica to alumina mole ratio of $\infty$. The term "essentially alumina-free" is used because it is difficult to prepare completely aluminum-free reaction mixtures for synthesizing these materials. Especially when commercial silica sources are used, aluminum is almost always present to a greater or lesser degree. The hydrothermal reaction mixtures from which the essentially alumina-free crystalline siliceous molecular sieves may be prepared can be referred to as being substantially alumina free. By this usage is meant that no aluminum is intentionally added to the reaction mixture, e.g., as an alumina or aluminate reagent, and that to the extent aluminum is present, it occurs only as a contaminant in the reagents. An additional method of increasing the mole ratio of silica to alumina is by using standard acid leaching or chelating treatments.

In preparing the crystalline material according to the present invention, the reaction mixture is maintained at an elevated temperature until crystals are formed. The temperatures during the hydrothermal crystallization step are typically maintained from about 100° C. to about 235° C., preferably from about 120° C. to about 200° C. The crystallization period is typically greater than 1 day and preferably from about 3 days to about 50 days.

The hydrothermal crystallization is usually conducted under pressure and usually in an autoclave so that the reaction mixture is subject to autogenous pressure. The reaction mixture can be stirred during crystallization.

Once the crystals have formed, the solid product is separated from the reaction mixture by standard mechanical separation techniques, such as filtration. The crystals are water-washed and then dried, e.g., at 90° C. to 150° C. for from 8 to 24 hours, to obtain the as synthesized zeolite crystals. The drying step can be performed at atmospheric or subatmospheric pressures.

During the hydrothermal crystallization step, the crystals can be allowed to nucleate spontaneously from the reaction mixture. The reaction mixture can also be seeded with crystals both to direct, and accelerate the crystallization, as well as to minimize the formation of any undesired crystalline phases. When seed crystals are used, typically 0.1% to about 10% of the weight of silica used in the reaction mixture are added.

Due to the unpredictability of the factors which control nucleation and crystallization in the art of crystalline oxide synthesis, not every combination of reagents, reactant ratios, and reaction conditions will result in crystalline products. Selecting crystallization conditions which are effective for producing crystals may require routine modifications to the reaction mixture or to the reaction conditions, such as temperature, and/or crystallization time. Making these modifications are well within the capabilities of one skilled in the art.

Typically the crystalline material, more specifically the synthetic molecular sieve or zeolite, is thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica alumina mole ratio. The zeolite can also be steamed; steaming helps stabilize the crystalline lattice to attack from acids. The zeolite can be used in intimate combination with hydrogenating components, such as tungsten, vanadium molybdenum, rhenium, nickel cobalt, chromium, manganese, or a noble metal, such as palladium or platinum, for those applications in which a hydrogenation-dehydrogenation function is desired. Typical replacing cations can include metal cations, e.g., rare earth, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, and Fe are particularly preferred.

Specific zeolites which may be formed by the process of the present invention include large pore zeolites. The process is especially useful for preparing zeolites such as Zeolite SSZ-24 which is described in U.S. Pat. No. 4,834,958, issued on May 30, 1989 to Zones, the disclosure of which is incorporated herein by reference.

The hydrogen, ammonium, and metal components can be exchanged into the zeolite. The zeolite can also be impregnated with the metals, or, the metals can be physically and intimately admixed with the zeolite using standard methods known to the art. And the metals can be occluded in the crystal lattice by having the desired metals present as ions in the reaction mixture from which the zeolite is prepared.

Typical ion-exchange techniques involve contacting the synthetic zeolite with a solution containing a salt of the desired replacing cation or cations. Although a wide variety of salts can be employed, chlorides and other halides, acetates, nitrates, and sulfates are particularly preferred. The zeolite is usually calcined prior to the ion-exchange procedure to remove the organic matter present in the channels and on the surface, since this results in a more effective ion exchange. Representative ion exchange techniques are disclosed in a wide variety of patents including U.S. Pat. Nos. 3,140,249; 3,140,251; and 3,140,253 each of which issued on Jul. 7, 1964 to Plank, et al.

Following contact with the salt solution of the desired replacing cation, the zeolite is typically washed with water and dried at temperatures ranging from 65° C. to about 200° C. After washing, the zeolite can be calcined in air or inert gas at temperatures ranging from about 200° C. to about 800° C. for periods of time ranging from 1 to 48 hours, or more, to produce a catalytically active product especially useful in hydrocarbon conversion processes.

Regardless of the cations present in the synthesized form of the zeolite, the spatial arrangement of the atoms which form the basic crystal lattice of the zeolite remains essentially unchanged. The exchange of cations has little, if any effect on the zeolite lattice structures.

The molecular sieve can be formed into a wide variety of physical shapes. Generally speaking, the zeolite can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or, dried or partially dried and then extruded.

The zeolite can be composited with other materials resistant to the temperatures and other conditions employed in organic conversion processes. Such matrix materials include active and inactive materials and synthetic or naturally occurring zeolites as well as inorganic materials such as clays, silica and metal oxides. The latter may be naturally occurring or may be in the form of gelatinous precipitates, sols, or gels, including mixtures of silica and metal oxides. Use of an active material in conjunction with the synthetic zeolite, combined with it, can improve the conversion and selectivity of the catalyst in certain organic conversion processes. Inactive materials can serve as diluents to control the amount of conversion in a given process so that products can be formed economically without using other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength and attrition resistance, because in petroleum refining the catalyst is often subjected to rough handling. This tends to break the catalyst down into powders which cause problems in processing.

Naturally occurring clays which can be composited with the synthetic zeolites of this invention include the montmorillonite and kaolin families, which families include the sub-bentonites and the kaolins commonly known as Dixie, McNamee, Georgia and Florida clays or others in which the main mineral constituent is halloysite, kaolinite, dickite, nacrite, or anauxite. Various clays such as sepiolite and attapulgite can also be used as supports. Such clays can be used in the raw state as originally mined or can be calcined, treated with acid, or chemically modified.

In addition to the foregoing materials, the zeolite can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel.

The zeolite can also be composited with other zeolites such as synthetic and natural faujasites (e.g., X and Y), erionites, and mordenites. They can also be composited with purely synthetic zeolites. The combination of zeolites can also be composited in a porous inorganic matrix.

The following examples demonstrate but do not limit the present invention.

EXAMPLES

There are numerous variations on the embodiments of the present invention illustrated in the Examples which are possible in light of the teachings supporting the present invention. It is therefore understood that within the scope of the following claims, the invention may be practiced otherwise than as specifically described or exemplified.

EXAMPLE 1

Preparation of N-Methyl Sparteine Hydroxide

Sparteine sulfate pentahydrate (100 grams) was neutralized using 50% aqueous NaOH, and the aqueous solution was extracted with $CH_2Cl_2$ to recover the free diamine. A 1-liter flask was charged with 55 grams of sparteine (0.24 moles) and 240 mL of $CHCl_3$. Methyl iodide (101 grams, 0.70 moles) was added over a 5 minute period and the homogeneous solution was stirred at room temperature for 6 days. Diethyl ether was added to the reaction mixture, and the resulting solids were recovered by filtration and recrystallized from hot acetone/$Et_2O$ and a small amount of MeOH.

The iodide salt (43.2 grams, 0.11 moles), 110 mL of water and 79 grams of Bio-Rad AG 1-X8 resin (20–50 mesh, hydroxide form) were stirred overnight in a polyethylene bottle. The molarity of the resultant solution was determined by titration with phenolphthalein.

EXAMPLE 2

Preparation of All-Silica Zeolite SSZ-24

4.98 g of N-Methyl Sparteine Hydroxide (0.60M), 3.71 g H$_2$O, 0.75 g 1.0N KOH and 0.92 g Cabosil M-5 were mixed together and heated at 160° C. for 26 days. The product of this reaction was found to be SSZ-24 with a small amount of layered material.

EXAMPLE 3

Preparation of Boron Containing Zeolite SSZ-24

5.56 g of a 0.60M solution of N-Methyl Sparteine Hydroxide was mixed with 4.23 g H$_2$O, 1.0 g 1.0N NaOH and 0.057 g Na$_2$B$_4$O$_7$.10H$_2$O. 0.92 g Cabosil M-5 was added in last and the mixture stirred to achieve homogeneity. After heating at 170° C. and rotating at 43 rpm for 14 days, a settled product was obtained and determined by XRD to be SSZ-24.

EXAMPLE 4

Preparation of Zeolite SSZ-24

2.49 g of a 0.60M solution of N-Methyl Sparteine Hydroxide, 4.43 g H$_2$O, 1.0 g 1.0N KOH and 0.60 g calcined B-beta zeolite (SiO$_2$/B$_2$O$_3$=33) were mixed together and heated at 150° C. for 13 days. The product obtained in this reaction was determined by XRD to be SSZ-24.

EXAMPLE 5

Preparation of Zeolite SSZ-24 by Conversion of Zeolite Y390

3.73 g of a 0.603M solution of N-Methyl Sparteine Hydroxide as the hydroxide salt, 3.62 g H$_2$O, 0.75 g 1.0N NaOH and 0.90 g TOSOH dealuminated Y zeolite (identified as HSZ-390HUA) (SiO$_2$/Al$_2$O$_3$=600) were mixed together and heated at 170° C. for 7 days. The product obtained in this reaction was determined by XRD to be SSZ-24.

What is claimed is:

1. A process for preparing crystalline molecular sieves comprising: contacting active sources of one or more oxides capable of forming a crystalline molecular sieve with an organocation templating agent derived from sparteine.

2. A process according to claim 1 wherein said oxide source is selected from the group consisting of monovalent element oxides, divalent element oxides, trivalent element oxides, tetravalent element oxides, and pentavalent element oxides.

3. A process according to claim 1 wherein said templating agent has the general formula:

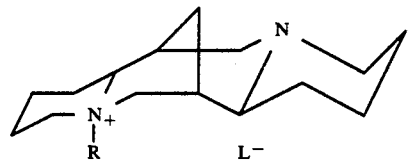

wherein R is each selected from the group consisting of hydrogen and a lower branched or straight chain alkyl; and L is an anion which is not detrimental to the formation of said molecular sieves.

4. A process according to claim 3 wherein said alkyl contains from 1 to about 10 carbon atoms.

5. A process according to claim 4 wherein said alkyl contains from 1 to about 3 carbon atoms.

6. A process according to claim 5 wherein R is methyl.

7. A process according to claim 3 wherein L is selected from the group consisting of halide or hydroxide.

8. A process according to claim 7 wherein said halide is selected from the group consisting of fluorine, chlorine, bromine, iodine, and combinations thereof.

9. A process according to claim 8 wherein said halide is iodide.

10. A process according to claim 1 wherein said molecular sieve is a large pore zeolite.

11. A process according to claim 10 wherein said molecular sieve is a crystalline silicate.

12. A process according to claim 11 wherein said molecular sieve is a crystalline aluminosilicate.

13. A process according to claim 11 wherein said molecular sieve is a crystalline borosilicate.

14. A process according to claim 1 wherein said zeolite is SSZ-24 and said template is a salt of methyl sparteine.

15. A process for preparing the large pore zeolite boron SSZ-24 which comprises:
   (a) preparing an aqueous solution containing one source of boron oxide and one source of silicon oxide capable of forming boron SSZ-24 and at least one conformationally constrained water-soluble sparteine ring system salt having an anionic moiety which is not detrimental to the formation of the molecular sieve;
   (b) maintaining the aqueous solution under conditions sufficient to form crystals of molecular sieve; and
   (c) recovering the crystals of molecular sieve.

16. A crystalline material composition, as synthesized and in the anhydrous state, in terms of oxide mole ratios, is (from about 1.5 to about 30)Q:(from about 0.25 to about 15.0)M$_2$O:W$_2$O$_3$:(greater than about 50)YO$_2$ wherein: Q is the sparteine templating agent described above; M is one or a combination of alkali metal cations and/or alkaline earth metal cations; W is one or a combination of elements selected from aluminum, boron, gallium, iron, titanium, and mixtures thereof; Y is one or a combination of elements selected from silicon, germanium, and mixtures thereof.

* * * * *